United States Patent [19]
Throckmorton et al.

[11] 3,903,112
[45] Sept. 2, 1975

[54] PHENYL GROUP IIB METALOXY COMPOUNDS

[75] Inventors: Peter E. Throckmorton, Burnsville; William J. McKillip, Minneapolis, both of Minn.

[73] Assignee: Ashland Oil, Inc., Ashland, Ky.

[22] Filed: Mar. 31, 1971

[21] Appl. No.: 129,991

[52] U.S. Cl. ...... 260/327 R; 260/239 R; 260/327 E; 260/327 TH; 260/329 ME; 260/333; 260/345.1; 260/345.9; 260/347.2; 260/347.8; 260/348 R; 260/429 R; 260/429.9; 260/431; 260/433
[51] Int. Cl.$^2$ ............. C07D 331/04; C07D 303/12; C07D 307/12
[58] Field of Search ......... 260/347.8, 348 R, 327 R, 260/345.9, 327 E, 239 R, 327 TH, 329 ME, 333

[56] References Cited
UNITED STATES PATENTS
2,206,804 7/1940 Burtner............................ 260/347.8
3,426,055 2/1969 Weinberg........................... 260/433

*Primary Examiner*—Henry R. Jiles
*Assistant Examiner*—Bernard I. Dentz

[57] ABSTRACT

A class of organic metallic compounds based on the Group IIB metals are disclosed, which compounds are structurally characterized in having an alkoxide, sulfide, or selenide moiety terminally containing a carbocyclic or a heterocyclic group wherein the hetero atom is either oxygen, sulfur or selenium. These organo metallic compounds are particularly effective as catalysts in the formation of urethane polymers and additionally find general usefulness as fungicides and bactericides.

15 Claims, No Drawings

PHENYL GROUP IIB METALOXY COMPOUNDS

BACKGROUND OF THE INVENTION

1. Field of the Invention

This invention relates to a novel class of organo metallic compounds in which the metal constituent is either mercury, cadmium or zinc.

2. Description of the Prior Art

Compounds of the Group IIB metals, particularly mercury in the divalent form thereof, are recognized as potentially effective fungicides, bactericides and catalysts for a variety of chemical reactions. In many of these applications, the use of an organophilic compound is called for. There are, however, a dearth of the latter type compounds whose inherent catalytic potential, fungi- or bactericidal activity is not adversely affected by the moiety of the compound which imparts organophilic properties thereto.

In the art areas concerned with urethane formation and related reactions for example, a need exists for an effective catalyst in inducing the reaction of a hindered aliphatic isocyanate with an active hydrogen-containing substance. Representative of such applications include the preparation of polyurethane type molding and coating compositions and the chemical modification of cellulosic and proteinaceous substrates with the isocyanate. Hitherto, no catalysts based on the Group IIB metal have been developed having practial usefulness in the aforesaid applications.

SUMMARY OF THE INVENTION

In accordance with the present invention, a class of organo metallic compounds are provided which correspond to the following structural formula:

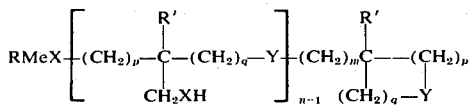

wherein Me is a Group IIB metal; R is lower alkyl, phenyl, alkyl phenyl or phenoxy phenyl; X is O, S or Se; R' is H, lower alkyl, $HXCH_2$ or $RMeXCH_2$; Y is O, S, Se or $CH_2$; $n$ is an integer of 1 to 4; $p$ is an integer of 1 to 4; $q$ is 0 or 1; and $m$ is 0 or 1.

As can be noted from the above formula, the compounds of this invention are the alkoxides, sulfides, selenides of a mono-organo derivative of a Group IIB metal. These compounds possess acceptable stability characteristics and by virtue of their having the terminal alicyclic or heterocyclic radical as indicated, improved organophilic properties are realized. Thus these compounds can be employed with advantage in organic based systems in attaining any of the contemplated utilitarian features thereof.

In addition to improved organnic solubility, the compounds of this invention can bear a plurality of primary hydroxyl, sulfhydryl or selenohydryl groups, which structural arrangement serves to compatibilize the compound with urethane forming reactants. Additionally, these compounds exhibit minimal steric requirements, which property in conjunction with the others singularly noted therefor result in their having exceptionally high activity in the catalysis of urethane forming reactants where the isocyanate is of the hindered aliphatic type.

DESCRIPTION OF THE PREFERRED EMBODIMENTS

The organo metallic compounds of this invention are readily prepared by effecting the condensation reaction of an organo metallic compound of the formula $RMeXH$ or $R_2Me$ wherein R, X and Me have the above-described meanings, with a heterocyclic compound corresponding to the formula

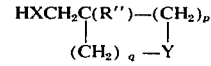

wherein R'' is H, lower alkyl or $HXCH_2$ and wherein X, Y, $p$ and $q$ have the above described meanings.

The underlying condensation reaction is advantageously carried out in the presence of an organic solvent for the heterocyclic compound. The preferred organic solvents are the inert polar solvents such as tetrahydrofuran, chlorbenzene, benzene and the like. The condensation reaction is facilitated through the use of a polar solvent forming an azeotrope with water. Benzene is especially preferred for this purpose and is employed in an amount so as to provide dilute solutions containing up to about 20% by weight of the heterocyclic compound.

In context of the foregoing, the applicable reaction temperature range is between about 80°–100°C. The organic metallic component of the reaction is preferably added to the solution of the heterocyclic compound while vigorously stirring the reaction mixture. Effective stirring is desirable so as to induce solvation of the organo metallic compound and in the case of reacting $RMeXH$ to minimize the auto-condensation thereof.

In general, the molar ratio of the heterocyclic compound to the organo metallic compound governs the type of ultimate product obtained. Normally, approximately equal equivalent ratios of the reactants are observed in deriving the simple alkoxides contemplated herein. Where it is desired, however, to obtain a telomerized product, the use of an excess of the heterocyclic compound over and above the equivalent amount thereof is desirably called for.

Further details relative to the applicable process for preparing the organo metallic compounds of this invention can be found in the following working examples. While these examples are directed to specific compounds of those contemplated herein, the representation afforded thereby will enable one skilled in the art to readily prepare any of the other compounds embraced by the invention. All parts are parts by weight unless otherwise indicated.

EXAMPLE I

Preparation of 1-hydroxymethyl-2-(phenylmercuroxy) ethyl glycidyl ether

Into a suitable reaction vessel equipped with a heating mantle, stirrer, reflux condenser and a Dean-Stark collection tube were charged 14.8 gms (0.2 mol) of glycidol and 500 ml of dry benzene. To the stirred solution of glycidol were added 29.5 gms (0.1 mol) of phenylmercuric hydroxide. With continuous rapid stirring, the reaction mixture was heated to reflux temperature and held thereat for 5 hours during which time 1.0 gm (0.055 mol) of water was azeotropically removed. The resultant benzene solution was decanted from 5.3 gms of insoluble material and vacuum stripped, leaving 22 gms of glassy solid product soluble in 2-ethoxyethanol, m.p. 71°C. (dec.), infrared absorption 1260 cm$^{-1}$ (oxirane). Required for $C_{12}H_{16}O_4Hg$: 32.3% C, 3.37% H, 52.3% Hg; Found: 33.8% C, 3.78% H, 47.2% Hg.

EXAMPLE II

Preparation of 3-methyl-3-phenyl mercuroxymethyl thietane

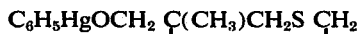

Into a reaction vessel equipped as in Example I and containing 39.6 gms (0.1 mol) of phenyl mercuric hydroxide in 500 ml of dry refluxing benzene was added rapidly 11.8 gms (0.1 mol) of the distilled 3-methyl-3-hydroxymethyl thietane. Stirring and refluxing was continued for 2 hours during which period 1.8 gms of water was obtained by azeotropic distillation. A grey, flocculant insoluble matter in the amount of 9.2 gms was recovered by filtration. The resultant clear yellow filtrate was evaporated to provide 33.7 gms of a viscous yellow liquid product. The product upon heating under vacuum decomposes leaving a black residue of mercuric sulfide. Upon standing in daylight for four days at room temperature, partial decomposition to form an elemental mercury is observed.

The assigned structure was supported by an infrared spectogram indicating only a trace of hydroxyl remaining. Absorptions characteristic of the aromatic ring (1620, 1605 cm$^{-1}$) and of the trimethylene sulfide or thietane ring (1170 cm$^{116\ 1}$) were present.

EXAMPLE III

Preparation of 2-ethyl-2-hydroxymethyl-3-(phenylmercuroxy) propyl 3'-ethyl-oxetane-3'-methylene ether

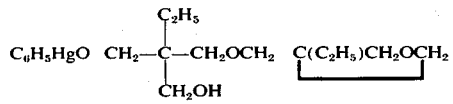

Into a reaction vessel equipped as in Example I were charged 30.8 gms (0.259 mol) of 3-ethyl-3-hydroxymethyloxetane and 1500 ml of benzene. The mixture was heated to form a solution and refluxed to remove traces of water. Phenyl mercuric hydroxide in the amount of 76.3 gms (0.259 mols) was added and the mixture maintained at reflux with vigorous stirring for 4.5 hours. During the period of reaction, 2.0 gms of water was collected in the Dean-Stark tube plus a small amount adhering to the condenser wall. The reaction mixture was filtered hot to remove unreacted phenyl mercuric hydroxide. The filtrate, upon vacuum evaporation, yielded 73.6 gms of a viscous liquid product. The infrared spectrogram showed strong hydroxyl and trimethylene oxide or oxetane absorptions, the latter at the characteristic frequency of 975 cm$^{-1}$. The nuclear magnetic resonance (NMR) spectrogram showed the presence of aromatic, methyl, methylene (ethyl group, oxetane ring) and hydroxyl protons. Required for $C_{18}H_{28}O_4Hg$: 42.4% C, 5.5% H, 39.5% Hg; Found: 42.44% C, 5.05% H, 35.5% Hg.

EXAMPLE IV

Preparation of 2-(phenylmercuroxymethyl) tetrahydrofuran

Into a reaction vessel equipped as in the previous examples were added 102 gms (1.00 mol) of 1-(hydroxymethyl)-tetrahydrofuran, 295 gms (1.00 mol) of phenyl mercuric hydroxide and 31. dry benzene. With fast stirring, the reaction mixture was heated at reflux for 6 hours during which period 14 gms of water was azeotropically removed. The resultant solution was gravity-filtered to remove 26 gms of insoluble grey solid comprising mostly unreacted phenyl mercuric hydroxide. The clear, yellow filtrate was evaporated in a rotary apparatus at 60°C. and 25 mm pressure. A pale yellow liquid residue product was obtained in the amount of 332 gms. The product was soluble in glycol ethers, chloroform, xylene and tetrahydrofuran. Required for $C_{11}H_{14}O_2Hg$: 35.7% C, 3.69% H, 52.8% Hg; Found: 34.63% C, 3.81% H, 51.05% Hg. Gel permeation chromatography with tetrahydrofuran solvent through successive columns of gels of pore sizes of 100, 100, 60 and 60A separated the product into 2 isomers; one isomer in the amount of 30% having a 10A molecular diameter and another isomer in the amount of 70% of 12.6A. For 2-(phenylmercuroxy methyl)-tetrahydrofuran, a van der Waals diameter of 11.2A was calculated. On this basis, the tetrahydrofuran derivative of the mercury compound comprises 70% of the product obtained in this example of 232 gms.

EXAMPLE V 2-(phenylmercuroxy)tetrahydropyran

As described in Example IV, a light yellow liquid organomercurial of the composition $C_{11}H_{14}O_2Hg$ was obtained. As further noted therein, the latter product was separated by gel permeation chromatography into two isomers. The first-named of said isomers (present as 30% of the total composition) was found to be of 10A diameter. The sample was assigned the 2-(phenylmercuroxy) tetrahydropyran structure upon calculating a van der Waals diameter of 10.9 A therefor.

EXAMPLE VI

Preparation of 3,3-bis (phenylmercuroxymethyl) oxetane

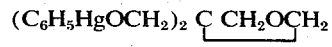

In a reaction vessel fitted as described in the previous examples, 29.0 gms (0.25 mol) of 3,3-bis-(hydroxymethyl) oxetane was dissolved in 1500 ml benzene and the solution refluxed to dry the system azeotropically. To the dry refluxing system was added 147 gms (0.50 mol) of phenylmercuric hydroxide and the reaction mixture continuously stirred under reflux conditions for 3.55 hours, at which time 9.4 ml of water was collected. Continued heating with vigorous stirring failed to generate any additional water. The reaction was allowed to cool and settle, whereupon the clear supernatant was decanted from a small amount of grey, insoluble matter. Evaporation of the supernatant at 55°C. and 35 mm yielded 62.1 gms of a solid residue product having a melting point of 89°–103°C. Extraction of the grey residue with 1 liter of benzene and evaporation of the resultant filtrate yielded 12.7 gms additional solid product, m.p. 89°–103°C., which exhibited an identical infrared spectrogram as that noted for the 62.1 gms of residue product. Thus, a total of 74.8 gms of product having a melting point of 89°–103°C. was obtained. The product showed an absorption at 970 cm$^{-1}$, indicating the presence of the trimethylene oxide or oxetane ring. Required for $C_{17}H_{18}O_3Hg_2$: 30.4% C, 2.7% H, 59.8% Hg; Found: 38.02% C, 2.97% H, 46.18% Hg.

EXAMPLE VII

Preparation of 3'-(hydroxymethyl)-oxetane-3'-methylene di[2,2-bis(hydroxymethyl-1,3-propyleneoxy] phenylmercury ether $C_6H_5HgOCH_2C(CH_2OH)_2CH_2OCH_2$-
$C(CH_2OH)_2CH_2OCH_2\underline{C(CH_2OH)CH_2OCH_2}$ Distilled 3,3-bis (hydroxymethyl) oxetane (bp 170°C., 0.4 mm) in the amount of 94.5 gms (0.815 mol) was dissolved in 3040 ml of boiling dry benzene. To the refluxing, rapidly stirred solution was added 51 gms (0.173 mol) of phenylmercuric hydroxide suspended in 200 ml of dry benzene over a period of 1.25 hours. The mixture was stirred at reflux for an additional 45 minutes. A total of 2.9 ml of water was collected by azeotropic distillation during the indicated reaction period. Upon cooling to room temperature, a precipitated solid was collected by decanting away the solvent and dried at 45°C. and 0.35 mm until solvent free. A total of 90.5 gms of product was obtained. The infrared spectrogram thereof showed strong absorptions characteristic of hydroxyl, phenyl and the trimethylene oxide or oxetane ring (790 cm$^{-1}$). The NMR spectrum showed the protons present only of aromatic, methylene, oxetane and hydroxyl. Required for $C_{21}H_{34}O_5Hg$; 30.8% Hg; Found: 28.9% Hg.

EXAMPLE VIII

Preparation of 2-(phenylmercuroxymethyl) tetrahydropyran $C_6H_5HgOCH_2\underline{CHCH_2CH_2CH_2CH_2O}$ A solution of 115 gms (1.00 mol) of tetrahydropyran-2-methanol dissolved in 5 liters of benzene was refluxed until the solution was dry. With heat off and fast stirring there was added over a period of 20 minutes 295 gms (1.00 mol) of phenylmercuric hydroxide. Refluxing temperature was regained and with continued stirring the reaction mixture was held for an additional 6.5 hours, whereupon 15 mls of water had collected in the Dean-Stark tube. All but 47.4 gms of the phenylmercuric hydroxide entered into solution. The unreacted portion thereof was removed by filtration. Upon evaporating the reaction solution at 75°C. and 25 mm, there was obtained 310.3 gms of a viscous light yellow product. The product was soluble in a variety of organic solvents including monoglyme, diglyme, ethoxyethanol, benzene, xylene, tetrahydrofuran and chloroform. The resultant product slowly decomposes in sunlight forming free mercury but exhibited good stability in the dark, both in solution in solvents such as the glymes or in the form of the neat liquid. Required for $C_{12}H_{16}O_2Hg$: 36.6% C, 4.3% H, 51.1% Hg; Found: 36.85% C, 4.2% H, 52.04% Hg.

EXAMPLE IX

Preparation of 2-(phenylzincoxymethyl)-tetrahydrofuran $C_6H_5ZnOCH_2\underline{CHCH_2CH_2CH_2O}$ To 14.7 gms (0.10 mol) of diphenylzinc in 251 gms of dry diglyme under an oil-pumped nitrogen blanket was added dropwise over 14 minutes with stirring, a solution of 11.0 gms (0.108 mol) of tetrahydrofurfuryl alcohol solution in 95 gms of dry diglyme and the clear solution resulting was gradually heated over one hour to 160°C., whereupon the diglyme solvent was partially removed by evaporation at 90°C. in a rotating flask under reduced pressure. There was obtained 16.0 gms of product as a 10.9% (active) solution in diglyme. Upon evaporation, a liquid was obtained which was soluble in diglyme and xylene. The infrared spectrogram of the neat liquid product showed hydroxyl absent, the phenyl ring present, and absorptions not present in the spectrogram of diphenyl zinc appearing as strong bands in the 1,000 – 1,200 cm$^{-1}$ region which showed the C — O — C moiety to be present. The presence of zinc in the product was confirmed by ignition in a flame of white zinc oxide. The product, unlike the corresponding mercurial compound of Example IV is not stable when exposed to the atmosphere. On such exposure it changes rapidly and spontaneously into a phenylzinc hydroxyl containing material less soluble and exhibiting substantially reduced catalytic activity than 2-(phenylzincoxymethyl) tetrahydrofuran in inducing the reaction of a hindered isocyanate with a hydroxyl bearing compound.

EXAMPLE X

This example describes two tests conducted to demonstrate the microbiological activity of a representative mercurial compound of this invention.

Test No. 1

This test method involved the "zone of inhibition" technique in which the diameter of a clear zone of no growth around a hollow glass cylinder, placed in the center of an agar plate, and containing 0.1 ml of the test solution, is taken as a measure of activity against a mixed culture of fungi and bacteria. The mercurial compound tested was that described in Example III, namely, 2-ethyl-2-hydroxymethyl-3-(phenylmercuroxy) propyl 3'-ethyl-oxetane-3' methylene ether. The mercurial compound was applied to the mixed culture as a solution thereof in xylene. The results obtained for the variously applied dosages of the mercurial compound are set forth in the following Table I.

Table I

| % Mercury of Solution | Diameter of Zone of Inhibition (mm.) |
|---|---|
| 4.0 | 47.8 |
| 0.4 | 26.8 |
| 0.2 | 24.8 |
| 0.1 | 22.0 |
| 0.05 | 16.8 |
| 0.025 | 15.0 |
| 0.0125 | 14.0 |
| 0.0 | 0.0 |

Test No. 2

The purpose of this test is to illustrate the fungicidal performance and permanency of the mercurial compound of Test No. 1 in a paint in comparison with phenylmercuric acetate which is conventionally used as a fungicide in such an application.

Four sets of filter paper strips were coated with an acrylic latex paint containing 0.1% Hg., and each set was then treated as follows:

A — no "weathering"; as is
B — heated at 60°C. for 24 hours
C — leached in running water at 40°C. for 24 hours Duplicate specimens, 1 inch square, were cut from each strip and placed on agar plates, which were then inoculated with a spore suspension of *Pullularia pullulans* and incubated for 30 days. Fungal growth was measured as the difference in the amount of light transmitted through the specimen before and after incubation. The results noted are as follows:

|  | A | B | C |
|---|---|---|---|
| Control | 42.0 | 48.1 | 47.7 |
| Phenylmercuric acetate | 22.5 | 31.8 | 38.2 |
| Compound of Example III | 34.0 | 39.7 | 43.3 |

The foregoing data indicate that a typical mercurial compound of this invention is an effective fungicide for paint applications and exhibits activity comparing favorably with the extremely toxic phenylmercuric acetate.

EXAMPLE XI

This example illustrates the use of the mercurial compounds of Examples IV and VI as catalysts for curing a polyurethane forming surface coating composition wherein the polyisocyanate component is of the hindered aliphatic type.

An addition polymer was prepared in conventional manner by solution polymerizing 50 parts styrene. 30 parts butyl acrylate, 10 parts hydroxyethyl acrylate and 10 parts 1,1-dimethyl-1-(2-hydroxypropyl) amine methacrylimide. The copolymerization mixture consisted of 50 parts comonomers and 50 parts of a mixture of xylene and butanol in the weight proportion of 2:1, respectively. Following polymerization, the polymer content of the solution was thermolyzed at 160°C. to result in the substantially complete conversion of the pendant aminimide groups thereof to isocyanate groups. After thermolysis, the non-volatile content of the solution was adjusted to 50% to compensate for solvent loss during thermolysis.

The thermolyzed copolymer was then employed as a vehicle or binder for a white enamel reduced to spraying viscosity with xylol containing about 21% $TiO_2$ pigment, 28% vehicle and 51% solvent. The mercurial compound under test was added to the paint as a solution thereof in 2-ethoxyethyl alcohol. The levels of catalyst used and the curing conditions observed together with various physical tests noted for the resultant films are set forth in the following Table II.

Table II

| Paint Test No. | 1 | 2 | 3 | 4 |
|---|---|---|---|---|
| Catalyst | Ex. IV | Ex. VI | Ex. VI | Blank |
| % Catalyst (based on vehicle) | 0.455* | 0.228** | 0.114** | Nil |
| Baking Schedule | ← 20 min. at 350°F. → | | | |
| Film thickness - mils | 2.0 | 1.4 | .5 | 1.9 |
| Sward Hardness | 50 | 50 | 54 | 52 |
| Gloss 60°/20° | 92/72 | 92/80 | 91/79 | 92/77 |
| Pencil Hardness | H | H | H | H |
| Impact front/rear | 104/18 | 132/28 | 160/60 | 70/16 |
| Knife Adhesion | Good + | Good | Good | Good |
| Mar Resistance | Excel. | Excel. | Excel. | Excel. |

*as a 33% soln of the mercurial cpd. in 2 ethoxy EtOH
**as a 16.6% soln of the mercurial cpd. in 2 ethoxy EtOH

What is claimed is:

1. A compound having the formula

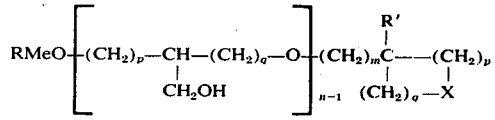

$$RMeO\left[(CH_2)_p-CH-(CH_2)_q-O\underset{CH_2OH}{|}\right]_{n-1}(CH_2)_m\underset{(CH_2)_q-X}{\overset{R'}{\underset{|}{C}}}(CH_2)_p$$

wherein:
Me is Group II B metal
R is phenyl
X is a chalcogen having an atomic number not in excess of 34
R' is H, lower alkyl, hydroxy lower alkyl or phenylmercuroxymethyl
n is an integer of 1 to 4
p is an integer of 1 to 4
q is an integer of 0 to 1
m is an integer of 0 to 1.

2. A compound in accordance with claim 1 wherein said Group IIB metal is mercury.

3. A compound in accordance with claim 2 wherein X represents an oxygen atom.

4. A compound in accordance with claim 2 wherein X represents a sulfur atom.

5. A compound in accordance with claim 3 wherein n is 1.

6. A compound in accordance with claim 3 wherein n is 2.

7. A compound in accordance with claim 5 wherein R' represents a hydrogen atom; p is 4; q is 0; and 0; is 1.

8. A compound in accordance with claim 6 wherein R' represents hydrogen; p is 1; q is 0; and m is 1.

9. A compound in accordance with claim 4 wherein R' represents a methyl group; and each of n, p, q and m is 1.

10. A compound in accordance with claim 3 wherein R' represents an ethyl group; and each of n, p, q and m is 1.

11. A compound in accordance with claim 3 wherein R' represents a hydroxy methyl group; n is 3; and each of p, q and m is 1.

12. A compound in accordance with claim 5 wherein R' represents a hydrogen atom; p is 3; q is 0, and m is 1.

13. A compound in accordance with claim 5 wherein R' represents a hydrogen atom; p is 4; q is 0 and m is 0.

14. A compound in accordance with claim 5 wherein R' represents a phenymercuroxymethyl group; and each of p, q and m is 1.

15. A compound in accordance with claim 1 wherein said Group IIB metal is zinc; R' represents a hydrogen atom; n is 1; p is 3; q is 0; and m is 1.

* * * * *